(12) United States Patent
Khoryaev et al.

(10) Patent No.: US 11,695,531 B2
(45) Date of Patent: Jul. 4, 2023

(54) RESOURCES SELECTION FOR FEEDBACK BASED NR-V2X COMMUNICATION

(71) Applicants: Alexey Khoryaev, Nizhny Novgorod (RU); Sergey Panteleev, Maynooth (IE); Mikhail Shilov, Nizhny Novgorod (RU); Andrey Chervyakov, Nizhny Novgorod (RU)

(72) Inventors: Alexey Khoryaev, Nizhny Novgorod (RU); Sergey Panteleev, Maynooth (IE); Mikhail Shilov, Nizhny Novgorod (RU); Andrey Chervyakov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 16/825,058

(22) Filed: Mar. 20, 2020

(65) Prior Publication Data

US 2020/0220694 A1 Jul. 9, 2020

Related U.S. Application Data

(60) Provisional application No. 62/842,436, filed on May 2, 2019.

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1816* (2013.01); *H04W 4/40* (2018.02); *H04W 28/04* (2013.01)

(58) Field of Classification Search
CPC ... H04L 5/0055; H04L 1/1816; H04L 1/1893; H04L 1/1896; H04L 1/1854; H04L 67/12;
(Continued)

(56) References Cited

U.S. PATENT DOCUMENTS

| | | | |
|---|---|---|---|
| 2013/0242889 A1* | 9/2013 | Khoryaev | H04L 1/1887 370/329 |
| 2020/0008176 A1* | 1/2020 | Shukair | H04W 4/46 |

(Continued)

FOREIGN PATENT DOCUMENTS

| | | | | |
|---|---|---|---|---|
| WO | WO-2020184955 A1 * | 9/2020 | | H04W 72/12 |
| WO | WO-2020190064 A1 * | 9/2020 | | H04W 4/40 |

*Primary Examiner* — Peter P Chau
(74) *Attorney, Agent, or Firm* — Schwegman Lundberg & Woessner, P.A.

(57) ABSTRACT

Devices and systems of sensing, resource selection and control signaling for feedback-less and feedback-based NR-V2X sidelink communication are described. Resource reservation and selection for sidelink retransmissions based on HARQ feedback are described for unicast, groupcast, and broadcast blind retransmissions. After exchanging HARQ feedback capability information for different types of communications, a HARQ-dependent or HARQ-independent resource selection occurs. Look-ahead and/or chain-based resource selection and reservation signaling is used, in which a single resource or some or all of the resources selected are signaled as reserved. Further resource selection of a single additional resource may occur after an initial resource selection. The resource selection for retransmissions may be adapted using a RSRP or distance threshold.

9 Claims, 7 Drawing Sheets

(51) Int. Cl.
*H04W 28/04* (2009.01)
*H04W 4/40* (2018.01)

(58) Field of Classification Search
CPC ......... H04W 4/40; H04W 28/04; H04W 4/46; H04W 28/26
See application file for complete search history.

(56) References Cited

U.S. PATENT DOCUMENTS

| | | | |
|---|---|---|---|
| 2020/0099479 A1* | 3/2020 | Park | H04W 92/18 |
| 2020/0112982 A1* | 4/2020 | Li | H04W 88/04 |
| 2020/0228290 A1* | 7/2020 | Baghel | H04L 5/0053 |
| 2020/0229170 A1* | 7/2020 | Gulati | H04W 52/245 |
| 2020/0275412 A1* | 8/2020 | Kim | H04L 1/1887 |
| 2020/0359375 A1* | 11/2020 | Hwang | H04W 72/0446 |
| 2021/0029687 A1* | 1/2021 | Hong | H04L 1/1812 |
| 2021/0226735 A1* | 7/2021 | Lee | H04L 1/1812 |
| 2021/0329606 A1* | 10/2021 | Zhao | H04W 72/04 |
| 2021/0377993 A1* | 12/2021 | Ayaz | H04W 76/14 |
| 2022/0078753 A1* | 3/2022 | Park | H04L 5/0053 |

* cited by examiner

RESOURCES SELECTION FOR FEEDBACK BASED NR-V2X COMMUNICATION

This application claims the benefit of priority under 35 U.S.C. 119(e) to U.S. Provisional Patent Application Ser. No. 62/842,436, filed May 2, 2019, which is incorporated herein by reference in its entirety.

TECHNICAL FIELD

Embodiments pertain to radio access networks (RANs). Some embodiments relate to vehicle-to-everything (V2X) communications in cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to 5G sidelink V2X communications.

BACKGROUND

The use of 3GPP LTE systems (including both LTE and LTE-A systems) has increased due to both an increase in the types of devices user equipment (UEs) using network resources as well as the amount of data and bandwidth being used by various applications, such as video streaming, operating on these UEs. For example, the growth of network use by Internet of Things (IoT) UEs, which include machine type communication (MTC) devices such as sensors and may use machine-to-machine (M2M) communications, as well as the burgeoning V2X communications, has severely strained network resources and increased communication complexity. V2X communications of a variety of different applications from a UE are to coordinate with various technologies, as well as among potentially rapidly moving vehicles. This may be particularly relevant to future generations of UEs, which may be able to communicate using various technologies. The introduction of unicast, as well as groupcast on top of support of broadcast operation in sidelink communications may appreciably impact V2X communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
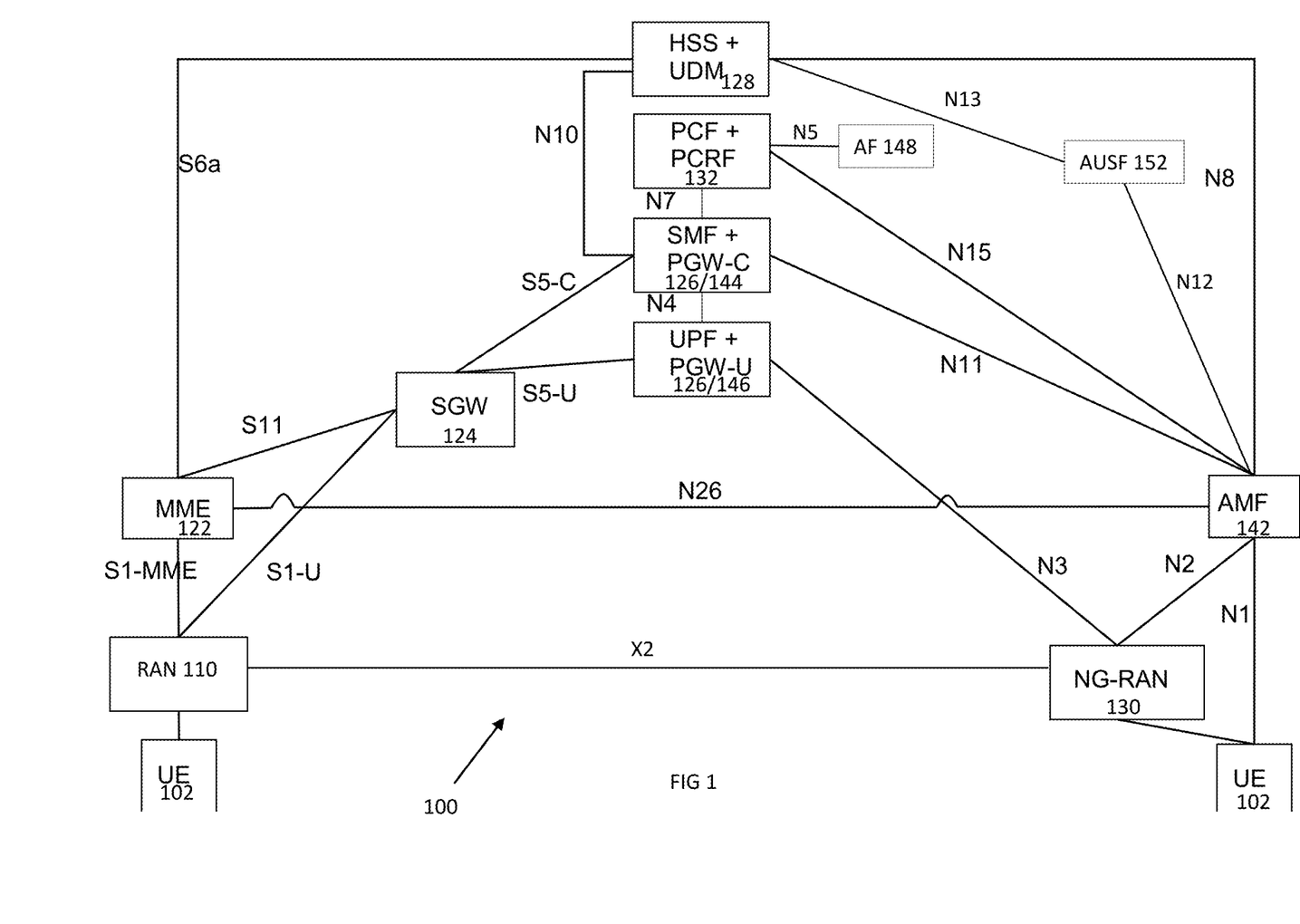
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (SGW) 124, and paging gateway (P-GW) 126.

In the NG network, the control plane and the user plane may be separated, which may permit independent scaling and distribution of the resources of each plane. The UE 102 may be connected to a radio access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an Sha interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
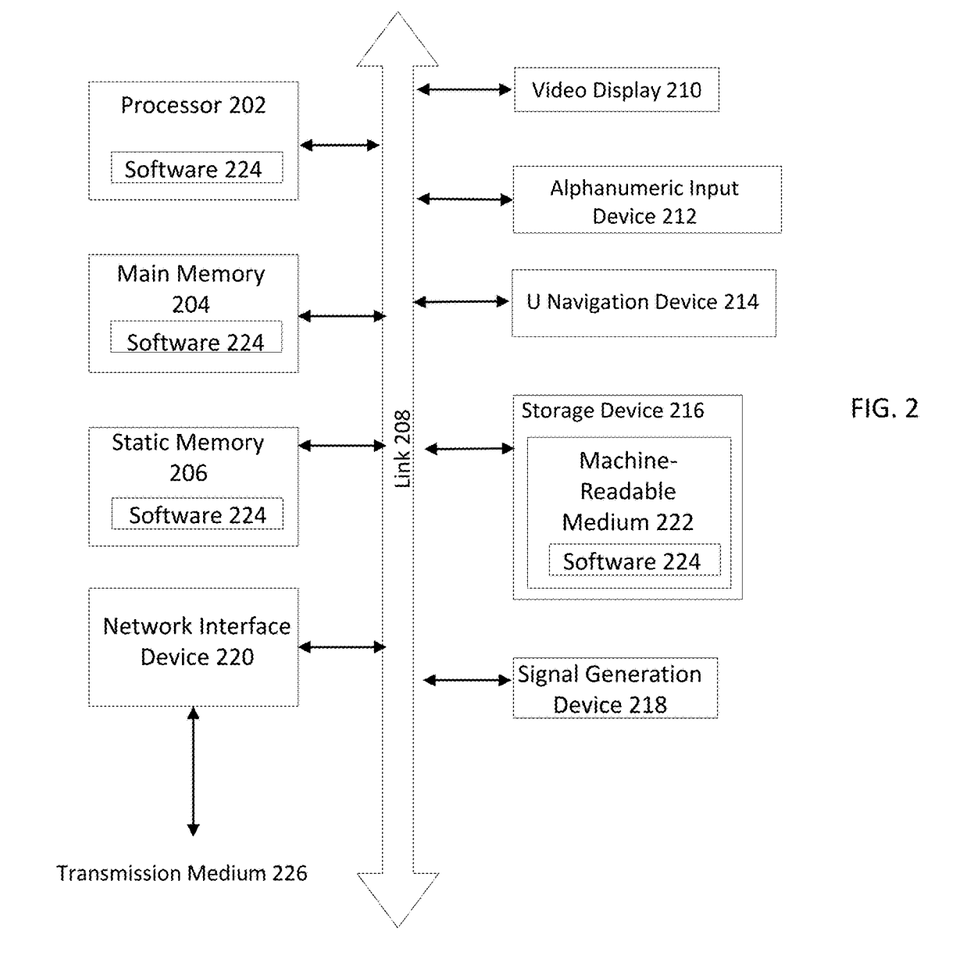
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication-based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device. In some embodiments, the communication device 200 may be embedded within other, non-communication-based devices such as vehicles and appliances used in V2X communications.

As above, UEs may engage in V2X communications using, for example, resources provided by a base station. V2X communications may be part of a next generation Intelligent Transportation System (ITS) that is to be designed to take into account the massive influx of low-data, high-delay and low power transmissions. There may be multiple radio access technologies (RAT) available for communications by V2X UEs. V2X UEs (also called on-board units or OBUs) may be equipped with a range of multiple access technologies for V2X communications, using protocols such as Dedicated Short Range Communication (DSRC), LTE, and NR, each of which may be direct or network-mediated communication between OBUs. The DSRC suite of protocols is based on the IEEE 802.11 standards, adding modifications to the exchange of safety messages between vehicles and vehicles and roadside units (RSUs).

The types of communications in the ITS may include Vehicle-to-Vehicle (V2V) communications, Vehicle-to-Infrastructure (V2I) communications, Vehicle-to-Network (V2N) communications and Vehicle-to-Pedestrian (V2P) communications. The communications may occur over a PC5 reference point. V2X applications in the V2X UEs may communicate with other vehicle-based V2X applications (V2V communications), V2I communications may involve communications with an RSU and V2N communications may involve communications with an eNB (or E-UTRAN) to provide various V2X services. The communications among OBUs may be coordinated by a traffic management server.

V2I transmission may be provided between a vehicle and UE (RSU). V2N transmission may be between a vehicle and a V2X application server. A V2X Application Server may be able to support multiple V2X applications. An RSU may be used to extend the range of a V2X message received from a vehicle by acting as a forwarding node (e.g., repeater). V2I may include communication between vehicles and traffic control devices, such as in the vicinity of road work. V2N may also include communication between vehicle and the server via the 4G/5G network, such as for traffic operations. Thus, an RSU may support V2I service that can transmit to, and receive from, a UE using V2I applications. In various embodiments, the RSU may be implemented in an eNB or a stationary UE. The RSU may rebroadcast V2X messages for other vehicles (V2V), pedestrians (V2P), or various networks systems (V2I) using a multimedia broadcast multicast service (MBMS) for LTE.

It is expected that NR-V2X communication systems will support a wide variety of use cases and deployment scenarios including basic safety message exchange, advanced driving applications, and extended sensor sharing. While basic safety applications may largely reuse the channel access LTE design that is based on sensing performed at the transmitter side, advanced applications may involve channel access schemes based on a combination of transmitter and receiver-based sensing to achieve higher data rates and reliability. Independent of the type of application, Hybrid Automatic Repeat reQuest (HARQ) feedback and HARQ combining in the physical layer may be used to improve the link performance of a sidelink communication in NR-V2X. HARQ-ACK (Acknowledge) or HARQ-NACK (Non-Acknowledge) feedback for data transmitted in the Physical Sidelink Shared Channel (PSSCH) may be carried in the Sidelink Feedback Control Information (SFCI) format(s) via the Physical Sidelink Feedback Control Channel (PSFCH) in resource allocation modes 1 (network controlled allocation) and 2 (autonomous allocation) for sidelink unicast and groupcast communications. The signals described herein may be encoded and then transmitted by the transmitting device and received and decoded by the receiving device.

The design of sidelink resource selection for feedback based NR-V2X sidelink communication and UE behavior for HARQ feedback may involve the use of an enhanced sensing and resource selection scheme to accommodate the transmission of feedback for each sidelink transmission by the UE and/or enhanced UE behavior for HARQ feedback transmission while retaining principles of sensing and resource selection scheme designed for blind retransmissions (e.g., broadcast communication without HARQ retransmissions). In one embodiment, to enable NR-V2X communications, the resource reservation of sidelink resources may include a resource reservation of sidelink resources for potential sidelink retransmissions which may be subject to HARQ feedback, enhanced sensing and resource selection behavior to ensure that the UE can send feedback for each sidelink transmission of a transmission block (TB) or subset of sidelink transmissions of a TB before occurrence of the next reserved resource, and enhanced UE HARQ behavior to ensure that the sensing and resource selection procedure designed for broadcast and blind retransmissions is reused to a large extent. The V2X communications may occur in some embodiments after the UE has indicated to the base station (eNB/gNB) the capability to use V2X communications, as well as an indication that V2X resources are desired to be used.

Inter-UE Capability Exchange:

NR-V2X UEs operating in unicast or groupcast mode need to exchange capabilities related to HARQ support if PSFCH channel is configured in one of the resource pools and UEs plan to support unicast and groupcast sidelink communication with HARQ feedback. The following information may be exchanged between UEs for sidelink communication in unicast and groupcast modes: support of HARQ based ACK/NACK signaling for unicast sidelink communication, time gaps for PSCCH/PSSCH-to-PSFCH transmission, time gaps for PSFCH-to-PSCCH/PSSCH transmission, the amount of feedback-based transmit/receive (TX/RX) processes for unicast/groupcast operation, and the type of HARQ operation for groupcast (i.e. support of NACK only, support of ACK only, or support of ACK and NACK). The capability exchange signaling may be a part of RRC connection or upper layer connection procedures and may be conducted in HARQ-less transmission modes, e.g., using blind retransmissions or broadcast communication.

Periodicity of PSFCH and Time Gap Between PSSCH-PSFCH:

The time gap between the PSSCH transmission and the HARQ feedback may be determined using the PSFCH. For example, the time gap between the PSSCH transmission and the HARQ feedback may be a fixed offset in time. In this case, PSFCH resources may be potentially allocated in every slot. This, however, may result in a high overhead regardless of PSFCH design. For example, two symbols may be used for the PSFCH itself, one symbol may for the PSFCH automatic gain control (AGC), and one symbol for PSFCH reception/demodulation. In addition, one symbol immediately before and one symbol immediately after the PSFCH can be allocated for a switching gap (to switch between transmission/reception) inserted in every slot may significantly diminish the useful PSSCH region.

Figure 3:
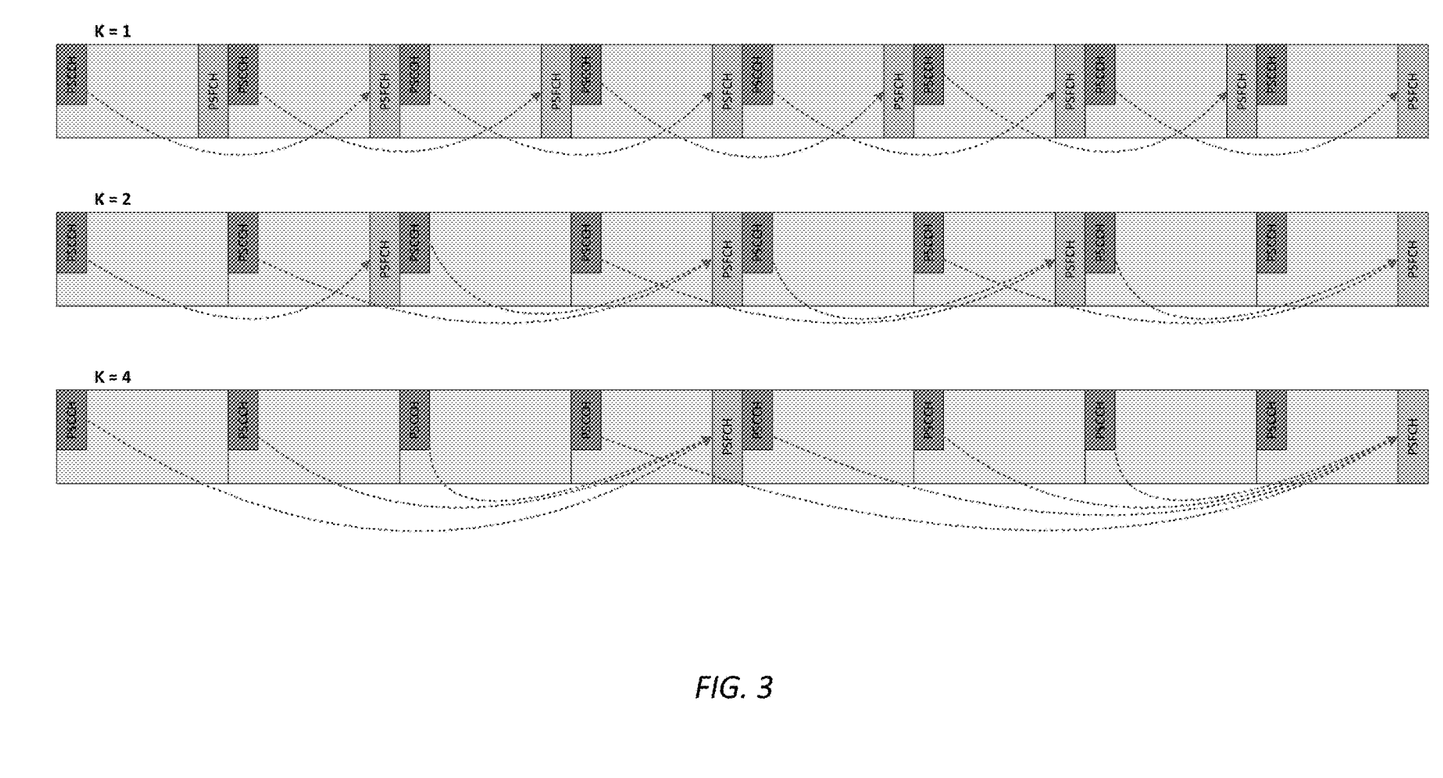
FIG. 3 illustrates periodic allocations in accordance with some embodiments.

In some embodiments, the PSFCH overhead may be reduced by more sparse allocation of PSFCH across slots, e.g. every K slots. This permits shaping the PSFCH overhead at the expense of increased HARQ Round Trip Time (RTT). FIG. 3 illustrates periodic allocations in accordance with some embodiments. In particular, FIG. 3 illustrates periodically allocated PSFCH resources and HARQ feedback multiplexing. The periodicity of PSFCH resources may be in range of e.g. K=1, K=2, or K=4 slots, although in some cases K=8 may be also considered if two slot aggregation is assumed. Although a larger K value may further reduce PSFCH overhead, such a large value may also lead to detrimental HARQ RTT and complications in HARQ feedback multiplexing. Thus, up to K=4 slots may be an acceptable tradeoff for NR-V2X sidelink communication.

In one embodiment, the PSFCH periodicity K may be configured as part of a pre-configuration for a resource pool in a carrier or as part of an RRC configuration from a set of K=1, 2, 4, 8. If the PSFCH periodicity configuration is not provided, then no PSFCH resources may be used. In another embodiment, the PSFCH may be configured as a separate resource pool. The UE may not assume that PSFCH resources from different resource pools may overlap. This may be used to prevent time overlap between the PSFCH and other channels. Further, the PSSCH-to-PSFCH and PSFCH-to-PSSCH time gaps may be lower bounded by the processing time of the PSCCH/PSSCH and PSFCH, respectively. For convenience, the processing times may be denoted as: $N_{s2F}$ as the number of symbols after the end of PSSCH and start of corresponding PSFCH and $N_{F2s}$ as number of symbols after the end of PSFCH and start of corresponding retransmission PSSCH.

Figure 4:
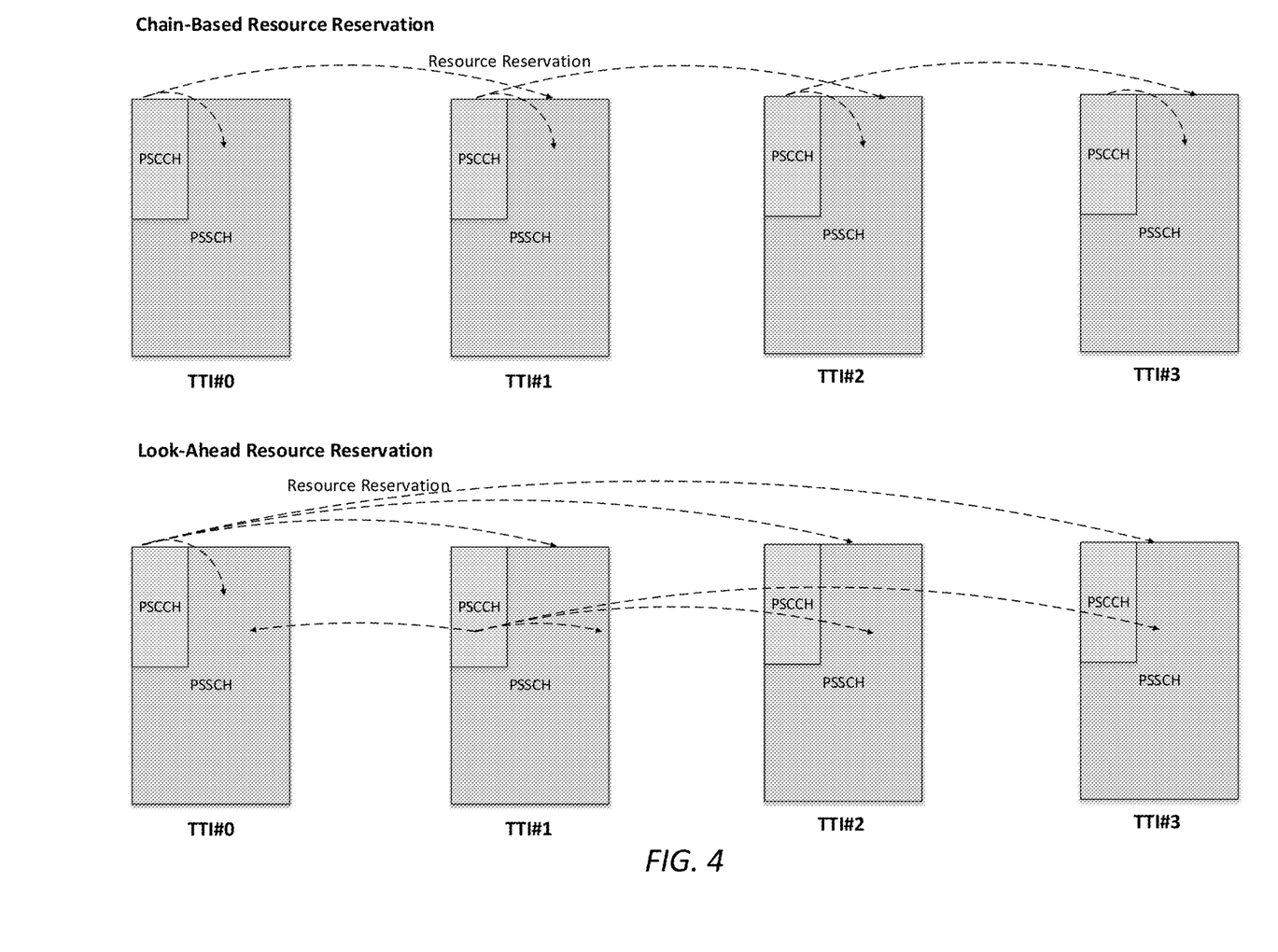
FIG. 4 illustrates resource reservation in accordance with some embodiments.

Resource Selection for Blind Retransmission:

FIG. 4 illustrates resource reservation in accordance with some embodiments. For NR V2X communication, in resource allocation Mode-2, the UE may autonomously select sidelink resources within resource selection window upon reception of a resource selection trigger. The resource selection window may be viewed as a time-frequency resource grid composed of sub-channels in frequency and slots in time, which is sliding in time. Once new packet arrives, the UE has a trigger to select sidelink resources for transmission. For broadcast communication, the UE may be expected to select a subset of sidelink resources (multiple sub-channels and slots for transmission of a TB) within resource selection window that are determined based on sensing procedure and considered as not being occupied by other UEs, or otherwise less congested. If there is no HARQ feedback activated, the UE may select any resources from candidate resources within resource selection window and transmit on all of the selected sidelink resources.

Once the UE sends an initial transmission, the UE may also indicate in control channel signalling resources selected for retransmissions. This mechanism, which is illustrated in the bottom portion of FIG. 4, can be considered as a look-ahead resource reservation signalling, where the UE reserves future resources for sidelink (re)-transmissions of a TB. This UE behaviour assumes that the decision on selected resources is done a priori of the first/initial transmission. Alternatively, a chain-based resource reservation in which the resource for future retransmission is selected immediately before the preceding (re)-transmission and also considered as a reserved. Chain-based resource reservation is illustrated in the top portion of FIG. 4.

In some embodiments, a minimum time gap, N_sens_proc, may be introduced between blind retransmissions for the resource selection procedure. The minimum time gap may accommodate at least the Sidelink Control Information (SCI) processing time and sensing/resource selection decision time. The time gap may depend on UE implementation. In other embodiments, however, the time gap may be specified as a minimum value, e.g. 2, 3 slots. The time gap may also be a function of subcarrier spacing and frequency range (FR1 and FR2). In further embodiments, the time gap may be (pre)-configured via RRC signaling or may be fixed in the 3GPP specification.

Resource Reservation and Resource Selection for Feedback Based Retransmission:

For unicast and groupcast communication, the sidelink retransmission may be subject to feedback from target receiver(s). Therefore, in general, a UE may independently select a sidelink resource for each retransmission if desired. However, if resources for retransmissions are not reserved in advance, independent resource selection for each retransmission based on HARQ feedback may cause each resource selection decision to be viewed as a random resource selection from the system perspective. Thus, to extract benefits from the sidelink sensing procedure, the resource reservation techniques may be applied even for the case of feedback-based sidelink retransmissions. The types of resource reservation and resource selection procedures that can be used in case of feedback-based retransmission may include resource selection that is independent of HARQ feedback (HARQ-unaware), and resource selection that is dependent of HARQ feedback (HARQ-aware).

Figure 5:
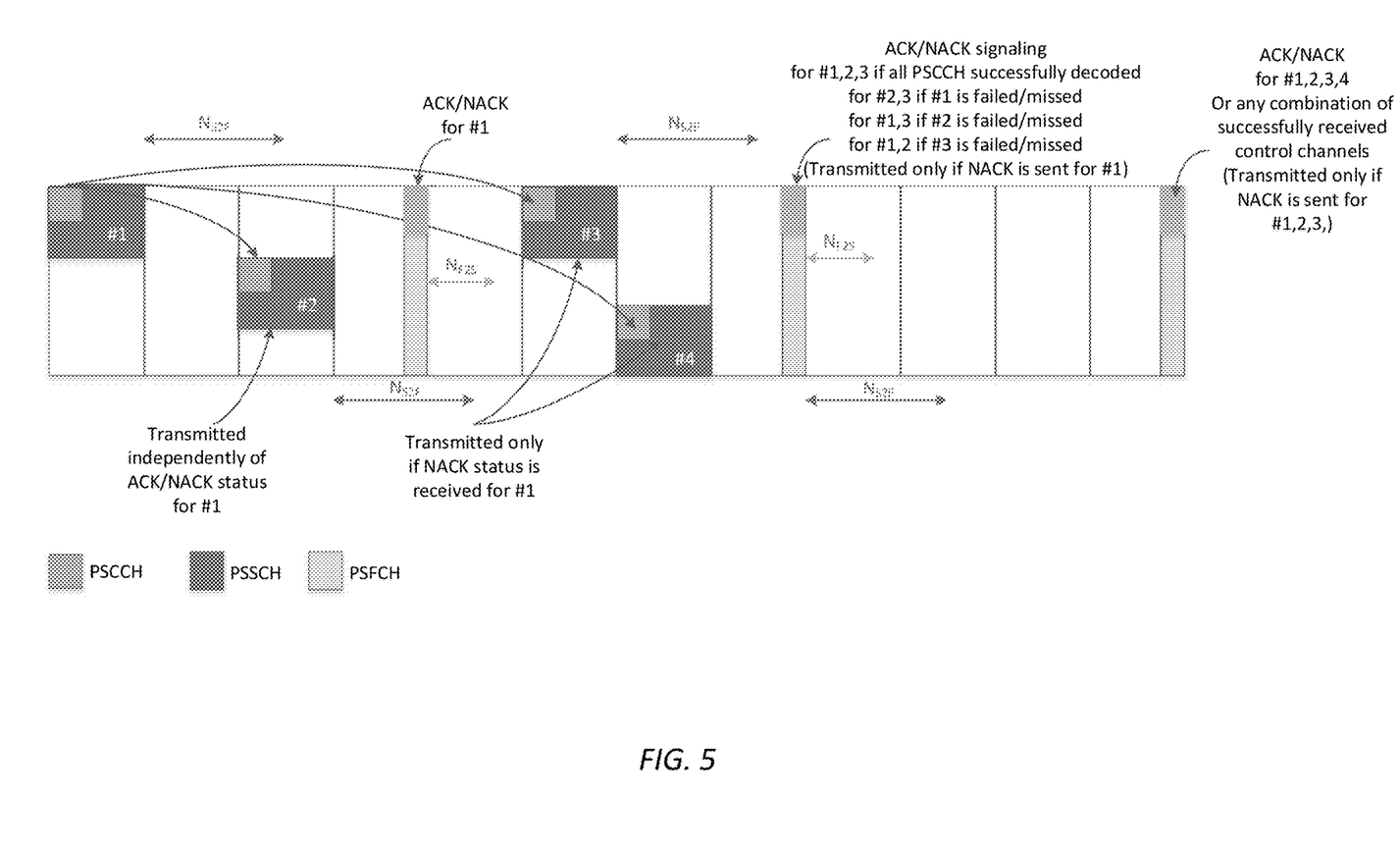
FIG. 5 illustrates feedback in accordance with some embodiments.

FIG. 5 illustrates feedback in accordance with some embodiments. In this case, in which resource selection is independent of HARQ feedback, for arrived packets the UE may perform resource selection in the same way as for blind retransmission. In other words, the UE selecting resources may not take into account $N_{S2F}$ and $N_{F2s}$ processing delays, nor may the UE assume that feedback from the receiver is to come for each of sidelink (re)-transmissions. Instead, the UE may assume that feedback is to come based on $N_{s2F}$ and $N_{F2s}$, and that some of the individual retransmissions may not be acknowledged while a combination of retransmission may always be acknowledged. This mode of operation, as shown in FIG. 5, can be considered as a resource reservation with feedback dependent on resource selection/allocation decision (i.e., a mix of HARQ aware and HARQ-unaware procedures for a TB). The benefit of this mode of operation is that procedures of sensing and resource selection designed for blind sidelink transmissions (i.e., without feedback) can be fully reused. In this case, multiple retransmission of the same TB may be allowed within the same PSFCH period. In addition, this option may provide higher reliability and lower latency.

Figure 6:
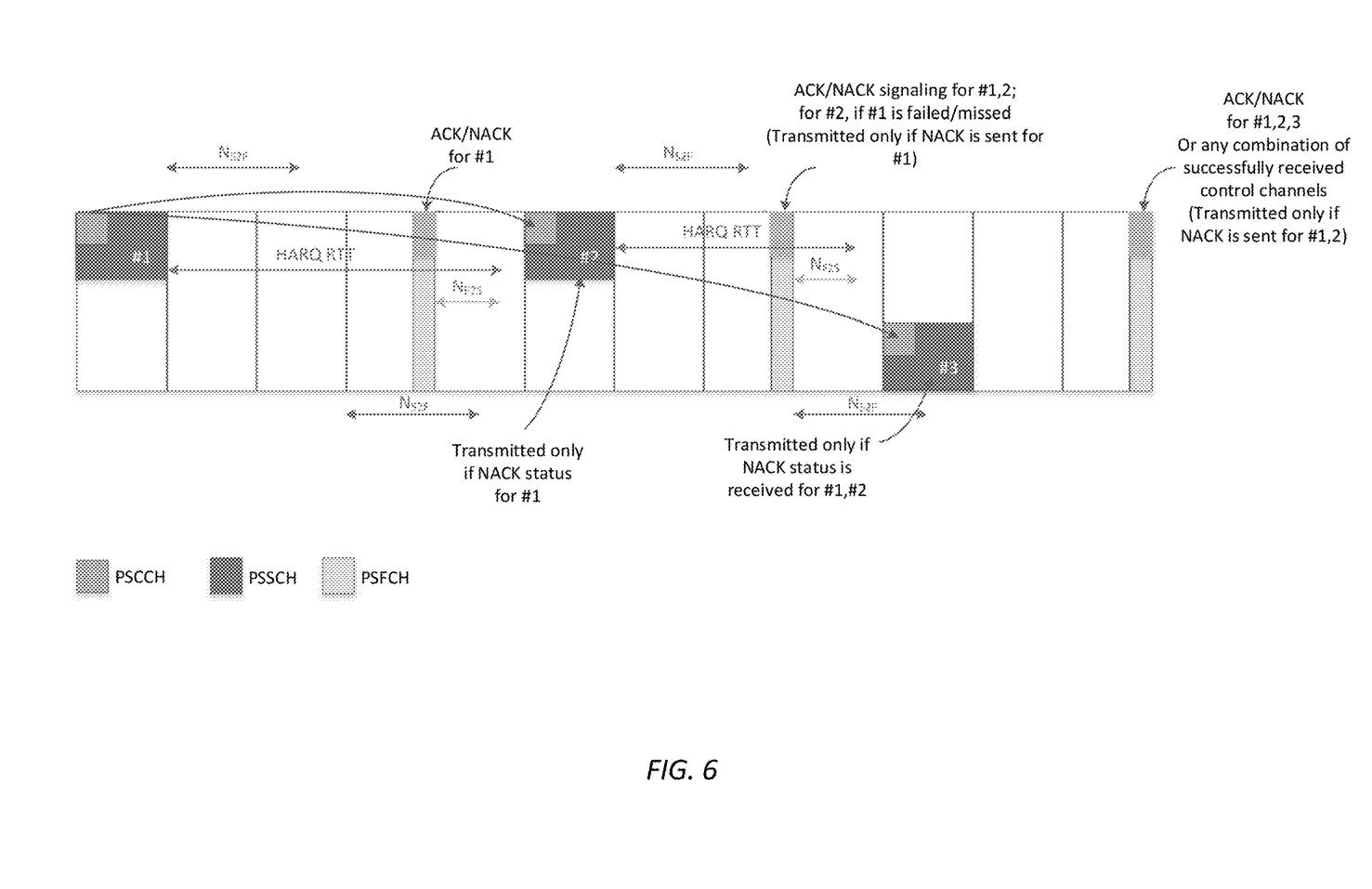
FIG. 6 illustrates resource selection in accordance with some embodiments.

FIG. 6 illustrates resource selection ensuring feedback per (re)-transmission in accordance with some embodiments. In this case, in which resource selection is dependent of HARQ feedback, for arrived packets the UE may perform resource selection in a way to ensure that for each (re)-transmission, the UE can receive and process a feedback from the receiver. This is to say that the HARQ round trip time, which depends on $N_{s2F}$ and $N_{F2s}$ delays, may be considered in resource selection process. In this case, only one sidelink (re)-transmission is allowed per PSFCH period for the same TB—except the cases of combination with blind retransmissions. The resource selection ensures that there is no more than one sidelink transmission (potentially bundled/aggregated) per PSFCH period. Therefore upon selection of the candidate resource for sidelink transmission, the next candidate resource may be selected only after the time T, which is a function of multiple arguments: HARQ RTT interval since the last symbol of the PSSCH (which is dependent on PSFCH period), $N_{F2S}$, $N_{S2F}$, and propagation delay with synchronization inaccuracy that may be absorbed by one extra symbol.

For the procedure of FIG. 6, one difference between look-ahead and chain-based resource reselection may be that for chain-based resource reservation, the NACK signalling may be used as a trigger for new resource selection. For look-ahead resource reselection, all resources may be selected in advance before the first transmission and thus reserved. In another alternative, chain-based resource reservation may emulate look-ahead principle for resource selection.

When feedback for HARQ retransmission is requested, the feedback may have implications on resource selection. One implication is that the maximum amount of resources a UE can select/reserve for feedback-based retransmissions may be a configurable parameter, predefined by specification, or left up to the UE. Assuming that the maximum number is predetermined, the UE may decide to select and reserve up to maximum number of resources for feedback-based retransmission $N_{MAX}$ (e.g., up to $N_{MAX}$ resources for retransmissions). Another implication is that if a NACK is received and all reserved resources are spent, it is beneficial to have functionality when the UE is able to prolong resource reservation if the NACK is received for all retransmissions and packet delay budget is still available.

Independent of whether blind retransmissions or HARQ-dependent transmissions are used, the resources used by the receiving UE for the HARQ feedback in the PSFCH may be based on the transmitter UE ID and transmission resource block selected by the transmitter UE. This may permit the HARQ feedback from different slots to be multiplexed in the PSFCH.

Look-Ahead and Chain-Based Resource Reselection and Reservation:

Look ahead resource (re)-selection assumes that for transmission of each TB, the UE selects N sidelink resources for transmission. Each sidelink resource may be composed from multiple sub-channels and slots. In this case, resource selection may be performed before the first/initial transmission of a TB and may not change for subsequent retransmissions. One potential drawback of look-ahead based resource reselection is that look-ahead based resource reselection may use an increased payload of SCI, given that each SCI may carry a pointer to all N resources (look-ahead reservation signalling). This drawback may be addressed through combination of look-ahead based resource selection and chain-based resource reservation signalling. In this case, resources may be selected in advance of the first/initial transmission, however reservation signalling itself can follow the chain-based resource reservation signalling principle. In this case, each transmission may additionally point to M≥1 retransmission resources, where M<N.

Figure 7:
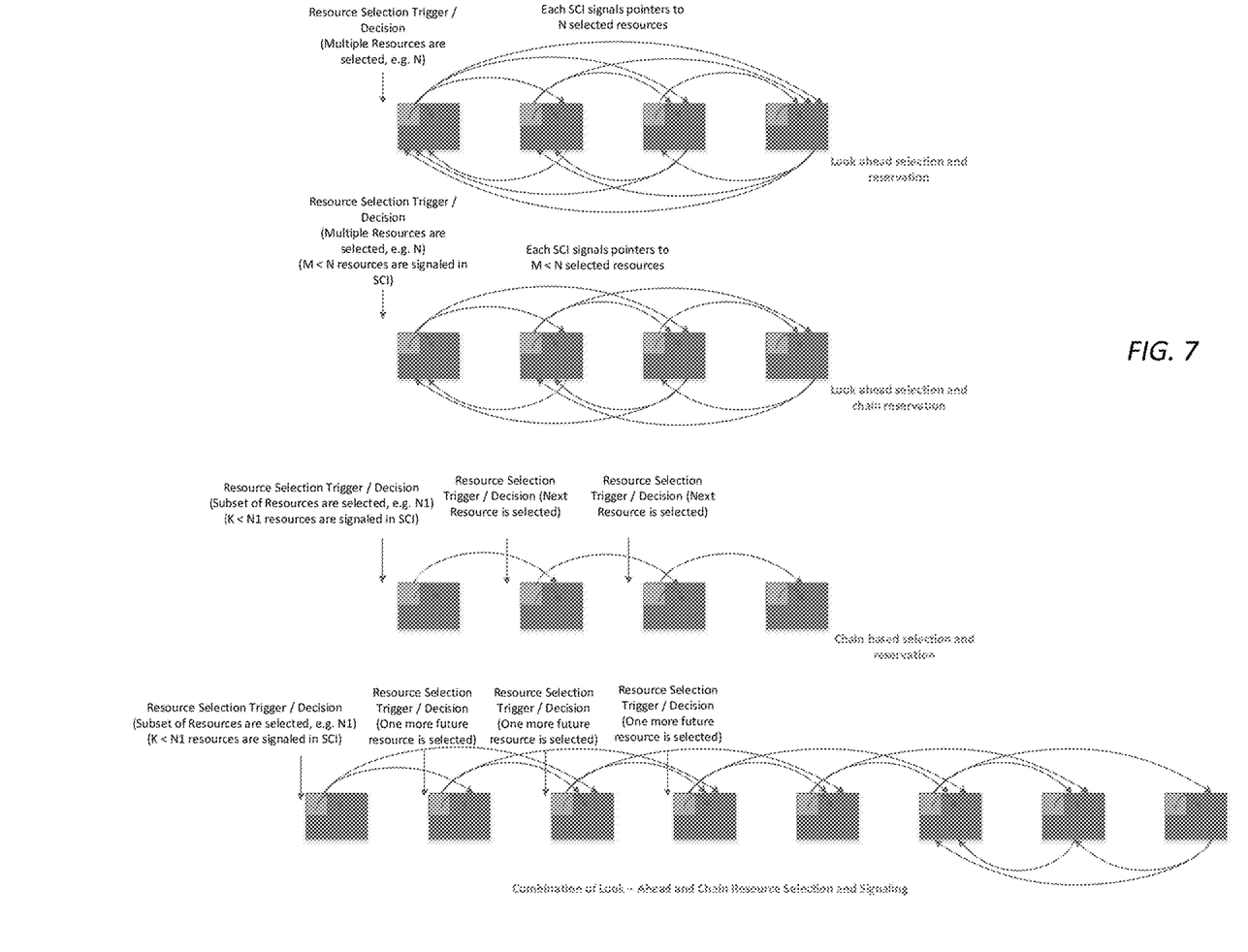
FIG. 7 illustrates resource reservation and selection in accordance with some embodiments.

FIG. 7 illustrates resource reservation and selection in accordance with some embodiments. In particular, FIG. 7 illustrates combinations of look-ahead and chain-based resource reservation and signaling used for NR-V2X communications. The schemes may include: look-ahead resource (re)-selection and look-ahead resource reservation signalling, look-ahead resource (re)-selection and chain-based resource reservation signalling, and chain-based resource (re)-selection and chain-based resource reservation signalling. When look-ahead resource (re)-selection and look-ahead resource reservation signalling is used, N resources may be selected a priori the initial transmission and N resources may be signalled as reserved.

When look-ahead resource (re)-selection and chain-based resource reservation signalling is used, N resources may be selected a priori the initial transmission, and M resources may be signalled as reserved during each transmission. In this case, a resource selection decision made before the initial transmission may not be reconsidered.

When chain-based resource (re)-selection and chain-based resource reservation signalling is used, M initial resources may be selected and K resources (K<M) may be signalled as reserved. Additional resource selection for single resource or multiple resources may be done at each subsequent transmission until (L-K) resources are transmitted, where L is maximum number of resources for transmission.

For NR-V2X sidelink communication, the set of possible values of N, M, K, L can be pre-configured per pool. Alternatively, the set of possible values of N, M, K, L can be determined by the UE and indicated with a corresponding pointer to selected resources using SCI signalling.

Dedicated Handling of Resources Reserved for Feedback-Based Retransmissions:

over-booking and inefficient resource utilization can be problematic for solutions based on reservation for potential retransmissions. However, this aspect depends on specific solutions. For instance, an adaptive Reference Signal Receive Power (RSRP) threshold principle applied in LTE-V2X may resolve such issues to a large extent even if feedback-based retransmission resources are considered as occupied, similar to blind retransmissions. Another way to resolve such issues may be to assume that feedback-based retransmission resources may not be fully utilized.

There are several mechanisms how the reserved resources can be handled by the UE selecting resources to avoid over-booking/over-reservation. The adaptive RSRP or distance-based threshold mechanism applied in a resource exclusion procedure may be able to take care of about all reserved sidelink resources. This mechanism may permit selection of resources, even if the resources are reserved, if RSRP measurements on these resources are below an RSRP threshold (or above a distance threshold). The RSRP threshold may be adaptively increased (or distance threshold may be decreased) if an insufficient amount of resources are found.

In further embodiments, the UE selecting resources may treat resources for feedback-based retransmissions with different priority. For instance, different RSRP/distance thresholds can be used for different retransmissions, with higher RSRP thresholds applied to the first retransmission and lower thresholds values applied to the subsequent retransmissions. It is also possible to prioritize for selection resources with a higher retransmission index assuming that such resources will be used with lower probability.

The above options address the expected problem of "over-booking". Another option to avoid over-reservation may be for all UEs to monitor the PSFCH channel to determine whether a PSCCH/PSSCH resource is released by processing ACK/NACK signaling.

Transport Block Size (TBS) Determination and Redundancy Version (RV) Cycling:

In presence of the PSFCH channel, there are slots that have different number of useful PSSCH symbols. This is to say that such slots may have PSFCH symbols without PSFCH symbols. As a result, transmissions of the same bandwidth may have different number of resource elements (REs) and therefore a different effective code-rate.

When blind retransmissions are employed, RV cycling may also be applied. The RV may be cycled in one of the following orders: [0,0,0,0], [0,2,3,1], [0,3,0,3]. Fundamentally, it may be better to map RV0 to a slot that has more REs in order to transmit more systematic bits. When the PSFCH is configured periodically, not all slots may be the slots with an increased number of REs. Therefore, depending on resource selection decisions, initial transmission may be with or without a PSFCH region. In order to optimize for any combination of resource selection decision, the RV cycling sequence may provide combinations of RV2 followed by RV0 when initial transmission contains a PSFCH region and next retransmission does not contain a PSFCH region.

In some embodiments, if the PSFCH is configured periodically with periodicity K>1, a UE may choose an RV cycling sequence that starts from RV2 and is followed by RV0, where RV2 is mapped to a slot with a PSFCH region and RV0 is mapped to a slot without PSFCH region. In some embodiments, if the PSFCH is configured periodically with periodicity K>1, a UE may choose an RV cycling sequence where RV3 or RV2 is mapped to a slot(s) with a PSFCH region and RV0 is mapped to a slot(s) without a PSFCH region.

Similarly, there may be cases when the PSCCH is either transmitted in a slot (e.g., every initial transmission of a bundle) or not transmitted in a slot (slot in a bundle other than initial one, depending on repetition scheme). Therefore, in these cases it may also be beneficial to use RV2 in the slot with a PSCCH and RV0 in the slot without a PSCCH.

Examples

Example 1 is an apparatus of a user equipment (UE), the apparatus comprising: processing circuitry configured to: encode a sidelink transmission for transmission to another UE using one of sidelink resources reserved for vehicle-to-everything (V2X) sidelink transmissions; decode, from the other UE, Hybrid Automatic Repeat reQuest (HARQ) feedback in response to the sidelink transmission; and encode, in response to a determination that a retransmission of the sidelink transmission is to be sent based on the HARQ feedback, the retransmission for transmission using another of the sidelink resources; and a memory configured to store the sidelink resources.

In Example 2, the subject matter of Example 1 includes that the processing circuitry is further configured to select resources and encode multiple retransmissions of the sidelink transmission that adjacent retransmissions are separated by at least a time gap that accommodates a HARQ round trip time, the HARQ round trip time comprising a processing time to process at least one of a Physical Sidelink Control Channel (PSCCH) or a first Physical Sidelink Shared Channel (PSSCH), preparation and processing time for the HARQ feedback, and time to process sensing data to decide which resource to select for reservation at a particular retransmission.

In Example 3, the subject matter of Examples 1-2 includes that a time gap between the sidelink transmission and the HARQ feedback is a fixed offset in time.

In Example 4, the subject matter of Examples 1-3 includes that resources for transmission of the HARQ feedback have a periodicity of K slots, where K is selected from among 1, 2, and 4.

In Example 5, the subject matter of Examples 1-4 includes that a lower bound of a time gap from the sidelink transmission to the HARQ feedback is a processing time of a Physical Sidelink Control Channel (PSCCH) and a lower bound of a time gap from the HARQ feedback to a next sidelink transmission is a processing time of the HARQ feedback.

In Example 6, the subject matter of Examples 1-5 includes that the processing circuitry is further configured to: determine a set of candidate resources for potential sidelink transmission of a transport block (TB); select a subset of resources from the set of candidate resources for sidelink transmissions of the TB; encode, for transmission to the other UE, control channel signalling indicating resources for potential retransmissions of the TB and a request for HARQ feedback; reserve up to two resources from the subset of resources through encoded Sidelink Control Information (SCI) signaling transmitted on a previously reserved resource or on a resource selected for an initial transmission of the TB; and release the up to two sidelink resources in response to reception of the HARQ ACK feedback.

In Example 7, the subject matter of Examples 1-6 includes that the processing circuitry is further configured to: encode, for transmission to the other UE, sidelink HARQ capabilities of the UE that include: support of HARQ-based signaling for unicast or groupcast sidelink communication, and a minimum time gap between: a UE transmission using one of the sidelink resources and HARQ feedback corresponding to the UE transmission, or the HARQ feedback corresponding to the UE transmission and a next UE transmission using another of the sidelink resources.

In Example 8, the subject matter of Examples 1-7 includes that the processing circuitry is further configured to: select a set of the sidelink resources to transmit a plurality of transmissions of a transport block (TB), selection of the set of the sidelink resources being independent of HARQ feedback round trip time associated with any of the plurality of transmissions.

In Example 9, the subject matter of Examples 1-8 includes that the processing circuitry is further configured to: select a set of the sidelink resources for multiple (N) transmissions to the other UE; encode, for transmission to the other UE prior to reception of first HARQ feedback, a subset N1 of the N transmissions using N1 sidelink resources that N1≤N;

decode the first HARQ feedback, the first HARQ feedback containing HARQ feedback associated with a subset of the N1 transmissions and free from HARQ feedback associated with remaining transmissions N1 of the N1 transmissions; and if the HARQ feedback associated with the subset of the N1 transmissions indicates a negative acknowledgment (NACK): encode, for transmission to the other UE after reception of the first HARQ feedback and prior to reception of second HARQ feedback in a different HARQ resource, a subset N2 of the N transmissions using N2 sidelink resources that N2≤(N−N1); and decode the second HARQ feedback, the second HARQ feedback containing HARQ feedback associated with the subset of the N1 transmissions or the subset of the N1 and N2 transmissions.

In Example 10, the subject matter of Examples 1-9 includes that the processing circuitry is further configured to: select a set of the sidelink resources to transmit a plurality of transmissions, selection of the set of the sidelink resources being dependent of HARQ feedback round trip time associated with the plurality of transmissions.

In Example 11, the subject matter of Examples 1-10 includes that the processing circuitry is further configured to: select a set of the sidelink resources from a candidate resource set to transmit a transport block (TB) multiple times to the other UE when a HARQ feedback request is activated; encode, for transmission to the other UE, a first transmission that, by Sidelink Control Information (SCI) signaling, indicates reservation of at least one sidelink resource for potential retransmissions of the TB prior to reception of first HARQ feedback; decode the first HARQ feedback, the first HARQ feedback containing HARQ feedback associated with the first transmission; and if the HARQ feedback associated with the first transmission indicates a negative acknowledgment (NACK): encode, for transmission to the other UE after reception of the first HARQ feedback and prior to reception of second HARQ feedback, a second transmission on a previously reserved resource, the second transmission being a retransmission of the first transmission and reserving at least one additional resource for further retransmission; and decode the second HARQ feedback, the second HARQ feedback containing HARQ feedback associated with the first transmission and the second transmission received by the other UE; and if the second HARQ feedback indicates a NACK for both the first transmission and the second transmission: encode, for transmission to the other UE, the third transmission after reception of the second HARQ feedback and prior to reception of third HARQ feedback, the third transmission being another retransmission of the first transmission; and decode the third HARQ feedback, the third HARQ feedback containing HARQ feedback associated with the first transmission, the second transmission, and the third transmission received by the other UE.

In Example 12, the subject matter of Examples 1-11 includes that the processing circuitry is further configured to: select a first set of the sidelink resources to transmit a first transmission to the other UE; encode, for transmission to the other UE prior to reception of first HARQ feedback, the first transmission; decode the first HARQ feedback, the first HARQ feedback containing HARQ feedback associated with the first transmission; and if the HARQ feedback associated with the first transmission indicates a negative acknowledgment (NACK): select a second set of the sidelink resources to transmit a second transmission to the other UE, the second transmission being a retransmission of the first transmission; encode, for transmission to the other UE, the second transmission after reception of the first HARQ feedback and prior to reception of second HARQ feedback; and decode the second HARQ feedback, the second HARQ feedback containing HARQ feedback associated with each of the first transmission and the second transmission successfully received by the other UE; and if the second HARQ feedback indicates a NACK for both the first transmission and the second transmission: select a third set of the sidelink resources to transmit a third transmission to the other UE, the third transmission being another retransmission of the first transmission; encode, for transmission to the other UE, the third transmission after reception of the second HARQ feedback and prior to reception of third HARQ; and decode the third HARQ feedback, the third HARQ feedback containing HARQ feedback associated with each of the first transmission, the second transmission, and the third transmission successfully received by the other UE.

In Example 13, the subject matter of Examples 1-12 includes that the processing circuitry is further configured to: determine a set of candidate sidelink resources to transmit a plurality of transmissions to the other UE; select one of the candidate sidelink resources for an initial transmission of a transport block (TB) and another of the candidate sidelink resources for retransmission of the TB; and encode, for transmission to the other UE, Sidelink Control Information (SCI) in a Physical Sidelink Control Channel (PSCCH), the SCI indicating the set of the candidate sidelink resources In Example 14, the subject matter of Examples 1-13 includes that the processing circuitry is further configured to: determine a set of candidate sidelink resources to transmit a plurality of transmissions to the other UE; and for each of the set of the sidelink resources: encode, for transmission to the other UE, Sidelink Control Information (SCI) in a Physical Sidelink Control Channel (PSCCH), the SCI indicating a subset of the sidelink resources of the set of the candidate sidelink resources that is reserved by a transmitting UE of the UE and the other UE.

In Example 15, the subject matter of Examples 1-14 includes that the processing circuitry is further configured to: select a set of candidate sidelink resources to transmit a plurality of transmissions to the other UE; encode, for transmission to the other UE, Sidelink Control Information (SCI) carried in a Physical Sidelink Control Channel (PSCCH), the SCI indicating reservation of up to three sidelink resources from the set of the candidate sidelink resources; and repeatedly: select, after each PSCCH transmission, a new sidelink resource for reservation from the candidate sidelink resources, and encode, for transmission to the other UE, another SCI in a new PSCCH, the other SCI in the new PSCCH indicating reservation of up to another three reserved sidelink resources from the set of the candidate sidelink resources.

Example 16 is an apparatus of a base station, the apparatus comprising: processing circuitry configured to: decode, from a user equipment (UE), a request for vehicle-to-everything (V2X) resources for transmission by the UE to another UE; encode, for transmission to the UE in response to reception of the request, an indication of sidelink resources to use by the UE for transmission to the other UE of: V2X transmissions, V2X retransmissions of the V2X transmissions, Hybrid Automatic Repeat reQuest (HARQ) feedback for the V2X transmissions and V2X retransmissions, and HARQ capabilities of the UE, the HARQ capabilities including support of HARQ-based signaling for unicast sidelink communication and a time gap between a UE transmission using one of the sidelink resources and HARQ feedback corresponding to the UE transmission or between the HARQ feedback corresponding to the UE transmission and a next UE transmission using another of the sidelink resources; and a memory configured to store the sidelink resources.

In Example 17, the subject matter of Example 16 includes that the sidelink resources for transmission of the HARQ feedback have a periodicity of K slots, where K is selected from among 1, 2, and 4.

In Example 18, the subject matter of Examples 16-17 includes that a lower bound of a time gap from the sidelink transmission to the HARQ feedback is a processing time of a Physical Sidelink Control Channel (PSCCH) and a lower bound of a time gap from the HARQ feedback to a next sidelink transmission is a processing time of the HARQ feedback.

Example 19 is a non-transitory computer-readable storage medium that stores instructions for execution by one or more processors of a user equipment (UE), the one or more processors to configure the UE to, when the instructions are executed: select sidelink resources reserved for vehicle-to-everything (V2X) sidelink transmissions and V2X sidelink retransmissions; send, to another UE, a first Physical Sidelink Control Channel (PSCCH) and a first Physical Sidelink Shared Channel (PSSCH) using a first sidelink resource of the sidelink resources, the PSSCH comprising a sidelink transmission, the first PSCCH indicating a set of the sidelink resources that includes, a second sidelink resource of the sidelink resources; receive, from the other UE in response to the V2X sidelink transmission, Hybrid Automatic Repeat reQuest (HARQ) feedback on a first Physical Sidelink Feedback Control Channel (PSFCH) indicated by the first PSCCH, the HARQ feedback indicating unsuccessful reception of the V2X sidelink transmission; determine, based on the HARQ feedback, that a V2X sidelink retransmission of the V2X sidelink transmission is to be sent to the other UE; and send to the other UE on the second sidelink resource, in response to a determination that the retransmission is to be sent, a second PSSCH comprising the V2X sidelink retransmission; and receive, from the other UE in response to the V2X retransmission, HARQ feedback on a second PSFCH indicated by the first PSCCH, the HARQ feedback on the second PSFCH comprising the HARQ feedback for the V2X sidelink transmission and HARQ feedback indicating successful or unsuccessful reception of the V2X sidelink retransmission, a periodicity of PSFCH resources being selected from among 1, 2, and 4 slots such that the first and second PSFCH are separated by 1, 2, or 4 slots, respectively.

In Example 20, the subject matter of Example 19 includes that the one or more processors further configure the UE to, when the instructions are executed: determine HARQ capabilities of the other UE, and send HARQ capabilities of the UE to the other UE using a HARQ-less transmission mode, the HARQ capabilities of the UE and the HARQ capabilities of the other UE each including support of HARQ-based signaling for unicast sidelink communication, a time gap from a particular PSCCH or PSSCH transmission to an associated PSFCH transmission, a time gap from a particular PSFCH transmission to a next PSCCH or PSSCH transmission, an amount of feedback-based transmit and receive processes for unicast and groupcast operation, and a type of HARQ operation for groupcast.

Example 21 is an apparatus of a user equipment (UE), the apparatus comprising: processing circuitry configured to: encode a transmission for transmission to another UE using one of sidelink resources reserved for vehicle-to-everything (V2X) transmissions; decode, from the other UE, Hybrid Automatic Repeat reQuest (HARQ) feedback in response to the transmission; and encode, in response to a determination that a retransmission of the transmission is to be sent based on the HARQ feedback, the retransmission for transmission using another of the sidelink resources; and memory configured to store the sidelink resources.

In Example 22, the subject matter of Example 21 includes that the processing circuitry is further configured to encode multiple retransmissions of the transmission, adjacent retransmissions separated by at least a time gap that includes a processing time to process HARQ feedback from one of the retransmissions, time for sensing if a resource is occupied, and time to decide which resource to select for a particular retransmission.

In Example 23, the subject matter of Examples 21-22 includes that a time gap between the transmission and the HARQ feedback is a fixed offset in time.

In Example 24, the subject matter of Examples 21-23 includes that resources for transmission of the HARQ feedback have a periodicity of K slots, where K is selected from among 1,2, and 4.

In Example 25, the subject matter of Examples 21-24 includes that a lower bound of a time gap from the transmission to the HARQ feedback is a processing time of the PSSCH and a lower bound of a time gap from the HARQ feedback to a next transmission is a processing time of the HARQ feedback.

In Example 26, the subject matter of Examples 21-25 includes that the processing circuitry is further configured to: determine that a new transmission is to be sent to the other UE after the transmission is sent; select resources from the sidelink resources for retransmissions of the new transmission; and encode, for transmission to the other UE after the new transmission is sent, control channel signalling indicating the resources for retransmissions of the new transmission.

In Example 27, the subject matter of Examples 21-26 includes that the processing circuitry is further configured to: encode, for transmission to the other UE, HARQ capabilities of the UE that include support of HARQ-based signaling for unicast sidelink communication and a time gap between a UE transmission using one of the sidelink resources and HARQ feedback corresponding to the UE transmission or between the HARQ feedback corresponding to the UE transmission and a next UE transmission using another of the sidelink resources.

In Example 28, the subject matter of Examples 21-27 includes that the processing circuitry is further configured to: select a set of the sidelink resources to transmit a plurality of transmissions, selection of the set of the sidelink resources being independent of HARQ feedback associated with any of the plurality of transmissions and prior to an earliest of the plurality of transmissions.

In Example 29, the subject matter of Examples 21-28 includes that the processing circuitry is further configured to: select a set of the sidelink resources to transmit a first transmission, a second transmission, a third transmission, and a fourth transmission to the other UE; encode, for transmission to the other UE prior to reception of first HARQ feedback, the first and second transmission using a first and second sidelink resource, respectively; decode the first HARQ feedback, the first HARQ feedback containing HARQ feedback associated with the first transmission and free from HARQ feedback associated with the second transmission; and if the HARQ feedback associated with the first transmission indicates a negative acknowledgment (NACK): encode, for transmission to the other UE after reception of the first HARQ feedback and prior to reception of second HARQ feedback in a different HARQ resource, the third transmission and fourth transmission using a third and fourth sidelink resource, respectively, the third transmission being a retransmission of the first transmission; and decode the second HARQ feedback, the second HARQ feedback containing HARQ feedback associated with each of the first transmission, the second transmission, and the third transmission successfully received by the other UE and free from HARQ feedback associated with the fourth transmission.

In Example 30, the subject matter of Examples 21-29 includes that the processing circuitry is further configured to: select a set of the sidelink resources to transmit a plurality of transmissions, selection of the set of the sidelink resources being dependent of HARQ feedback associated with the plurality of transmissions and prior to an earliest of the plurality of transmissions.

In Example 31, the subject matter of Examples 21-30 includes that the processing circuitry is further configured to: select a set of the sidelink resources to transmit a first transmission, a second transmission, and a third transmission to the other UE; encode, for transmission to the other UE, the first transmission prior to reception of first HARQ feedback; decode the first HARQ feedback, the first HARQ feedback containing HARQ feedback associated with the first transmission; and if the HARQ feedback associated with the first transmission indicates a negative acknowledgment (NACK): encode, for transmission to the other UE after reception of the first HARQ feedback and prior to reception of second HARQ feedback, the second transmission, the second transmission being a retransmission of the first transmission; and decode the second HARQ feedback, the second HARQ feedback containing HARQ feedback associated with each of the first transmission and the second transmission successfully received by the other UE; and if the second HARQ feedback indicates a NACK for both the first transmission and the second transmission: encode, for transmission to the other UE, the third transmission after reception of the second HARQ feedback and prior to reception of third HARQ feedback, the third transmission being another retransmission of the first transmission; and decode the third HARQ feedback, the third HARQ feedback containing HARQ feedback associated with each of the first transmission, the second transmission, and the third transmission successfully received by the other UE.

In Example 32, the subject matter of Examples 21-31 includes that the processing circuitry is further configured to: select a first set of the sidelink resources to transmit a first transmission to the other UE; encode, for transmission to the other UE prior to reception of first HARQ feedback, the first transmission; decode the first HARQ feedback, the first HARQ feedback containing HARQ feedback associated with the first transmission; and if the HARQ feedback associated with the first transmission indicates a negative acknowledgment (NACK): select a second set of the sidelink resources to transmit a second transmission to the other UE, the second transmission being a retransmission of the first transmission; encode, for transmission to the other UE, the second transmission after reception of the first HARQ feedback and prior to reception of second HARQ feedback; and decode the second HARQ feedback, the second HARQ feedback containing HARQ feedback associated with each of the first transmission and the second transmission successfully received by the other UE; and if the second HARQ feedback indicates a NACK for both the first transmission and the second transmission: select a third set of the sidelink resources to transmit a third transmission to the other UE, the third transmission being another retransmission of the first transmission; encode, for transmission to the other UE, the third transmission after reception of the second HARQ feedback and prior to reception of third HARQ; and decode the third HARQ feedback, the third HARQ feedback containing HARQ feedback associated with each of the first transmission, the second transmission, and the third transmission successfully received by the other UE.

In Example 33, the subject matter of Examples 21-32 includes that the processing circuitry is further configured to: select a set of the sidelink resources to transmit a plurality of transmissions to the other UE; and encode, for transmission to the other UE, Sidelink Control Information (SCI) in a Physical Sidelink Control Channel (PSCCH), the SCI indicating the set of the sidelink resources.

In Example 34, the subject matter of Examples 21-33 includes that the processing circuitry is further configured to: select a set of the sidelink resources to transmit a plurality of transmissions to the other UE; and for each of the set of the sidelink resources: encode, for transmission to the other UE, Sidelink Control Information (SCI) in a Physical Sidelink Control Channel (PSCCH), the SCI indicating a unique subset of the sidelink resources of the set of the sidelink resources that occur after transmission of the PSCCH.

In Example 35, the subject matter of Examples 21-34 includes that the processing circuitry is further configured to: select a set of the sidelink resources to transmit a plurality of transmissions to the other UE; encode, for transmission to the other UE, Sidelink Control Information (SCI) in a Physical Sidelink Control Channel (PSCCH), the SCI indicating a single sidelink resource of the set of the sidelink resources, the single resource being an earliest sidelink resource of the set of the sidelink resources after the PSCCH; and repeatedly: select, after each PSCCH transmission, a single new sidelink resource of the sidelink resources, and encode, for transmission to the other UE, a SCI in a new PSCCH, the SCI in the new PSCCH indicating another single sidelink resource of the set of the sidelink resources, the other single resource being an earliest sidelink resource after the next PSCCH.

In Example 36, the subject matter of Examples 21-35 includes that the processing circuitry is further configured to: select a set of the sidelink resources to transmit a plurality of transmissions to the other UE; encode, for transmission to the other UE, Sidelink Control Information (SCI) in a Physical Sidelink Control Channel (PSCCH), the SCI indicating a subset of the set of the sidelink resources; and repeatedly: select, after each PSCCH transmission, a single new sidelink resource of the sidelink resources, and encode, for transmission to the other UE, a SCI in a new PSCCH, the SCI in the new PSCCH indicating a unique subset of the set of the sidelink resources that includes the single new sidelink resource of the sidelink resources.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-30.

Example 39 is a system to implement of any of Examples 1-36.

Example 40 is a method to implement of any of Examples 1-36.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus of a user equipment (UE), the apparatus comprising:
processing circuitry configured to:
encode a sidelink transmission for transmission to another UE using one of sidelink resources reserved for vehicle-to-everything (V2X) sidelink transmissions;
decode, from the other UE, Hybrid Automatic Repeat reQuest (HARQ) feedback in response to the sidelink transmission; and
encode, in response to a determination that a retransmission of the sidelink transmission is to be sent based on the HARQ feedback, the retransmission for transmission using another of the sidelink resources; and
a memory configured to store the sidelink resources,
wherein the processing circuitry is further configured to:
determine a set of candidate resources for potential sidelink transmission of a transport block (TB);
select a subset of resources from the set of candidate resources for sidelink transmissions of the TB;
encode, for transmission to the other UE, control channel signalling indicating resources for potential retransmissions of the TB and a request for the HARQ feedback;
reserve up to two resources from the subset of resources through encoded Sidelink Control Information (SCI) signaling transmitted on a previously reserved resource or on a resource selected for an initial transmission of the TB; and
release the up to two sidelink resources in response to reception of HARQ ACK feedback.

2. An apparatus of a user equipment (UE), the apparatus comprising:
processing circuitry configured to:
encode a sidelink transmission for transmission to another UE using one of sidelink resources reserved for vehicle-to-everything (V2X) sidelink transmissions;
decode, from the other UE, Hybrid Automatic Repeat reQuest (HARQ) feedback in response to the sidelink transmission; and
encode, in response to a determination that a retransmission of the sidelink transmission is to be sent based on the HARQ feedback, the retransmission for transmission using another of the sidelink resources; and
a memory configured to store the sidelink resources,
wherein the processing circuitry is further configured to encode, for transmission to the other UE, sidelink HARQ capabilities of the UE that include:
support of HARQ-based signaling for unicast or groupcast sidelink communication, and
a minimum time gap between:
a UE transmission using one of the sidelink resources and HARQ feedback corresponding to the UE transmission, or
the HARQ feedback corresponding to the UE transmission and a next UE transmission using another of the sidelink resources.

3. An apparatus of a user equipment (UE), the apparatus comprising:
processing circuitry configured to:
encode a sidelink transmission for transmission to another UE using one of sidelink resources reserved for vehicle-to-everything (V2X) sidelink transmissions;
decode, from the other UE, Hybrid Automatic Repeat reQuest (HARQ) feedback in response to the sidelink transmission; and
encode, in response to a determination that a retransmission of the sidelink transmission is to be sent based on the HARQ feedback, the retransmission for transmission using another of the sidelink resources; and
a memory configured to store the sidelink resources,
wherein the processing circuitry is further configured to:
determine a set of candidate sidelink resources to transmit a plurality of transmissions to the other UE;
select one of the candidate sidelink resources for an initial transmission of a transport block (TB) and another of the candidate sidelink resources for retransmission of the TB; and
encode, for transmission to the other UE, Sidelink Control Information (SCI) in a Physical Sidelink Control Channel (PSCCH), the SCI indicating the set of the candidate sidelink resources.

4. The apparatus of claim 3, wherein a minimum time gap between the sidelink transmission and the HARQ feedback is a fixed offset in time.

5. The apparatus of claim 3, wherein a sidelink resource for the HARQ feedback has a periodicity of K slots, where K is selected from among 1, 2, and 4.

6. The apparatus of claim 3, wherein
the selection of the another of the candidate sidelink resources for retransmission of the TB is independent of HARQ feedback round trip time associated with the retransmission of the TB.

7. An apparatus of a user equipment (UE), the apparatus comprising:
processing circuitry configured to:
encode a sidelink transmission for transmission to another UE using one of sidelink resources reserved for vehicle-to-everything (V2X) sidelink transmissions;
decode, from the other UE, Hybrid Automatic Repeat reQuest (HARQ) feedback in response to the sidelink transmission; and
encode, in response to a determination that a retransmission of the sidelink transmission is to be sent based on the HARQ feedback, the retransmission for transmission using another of the sidelink resources; and
a memory configured to store the sidelink resources,
wherein the processing circuitry is further configured to:
determine a set of candidate sidelink resources to transmit a plurality of transmissions to the other UE; and
for each sidelink resource of the set of candidate sidelink resources:
encode, for transmission to the other UE, Sidelink Control Information (SCI) in a Physical Sidelink Control Channel (PSCCH), the SCI indicating a subset of sidelink resources of the set of candidate sidelink resources that is reserved by a transmitting UE of the UE and the other UE.

8. A non-transitory computer-readable storage medium that stores instructions for execution by one or more processors of a user equipment (UE), the one or more processors to configure the UE to, when the instructions are executed:
select sidelink resources reserved for vehicle-to-everything (V2X) sidelink transmissions and V2X sidelink retransmissions;
send, to another UE, a first Physical Sidelink Control Channel (PSCCH) and a first Physical Sidelink Shared Channel (PSSCH) using a first sidelink resource of the sidelink resources, the PSSCH comprising a sidelink transmission, the first PSCCH indicating a set of the sidelink resources that includes a second sidelink resource of the sidelink resources;
receive, from the other UE in response to a V2X sidelink transmission, Hybrid Automatic Repeat reQuest (HARQ) feedback on a first Physical Sidelink Feedback Control Channel (PSFCH) indicated by the first PSCCH, the HARQ feedback indicating unsuccessful reception of the V2X sidelink transmission;
determine, based on the HARQ feedback, that a V2X sidelink retransmission of the V2X sidelink transmission is to be sent to the other UE;
send to the other UE on the second sidelink resource, in response to a determination that the retransmission is to be sent, a second PSSCH comprising the V2X sidelink retransmission; and
receive, from the other UE in response to the V2X retransmission, HARQ feedback on a second PSFCH indicated by the first PSCCH, the HARQ feedback on the second PSFCH comprising the HARQ feedback for the V2X sidelink transmission and HARQ feedback indicating successful or unsuccessful reception of the V2X sidelink retransmission, a periodicity of PSFCH resources being selected from among 1, 2, and 4 slots such that the first and second PSFCH are separated by 1, 2, or 4 slots, respectively.

9. The medium of claim 8, wherein the one or more processors further configure the UE to, when the instructions are executed:
determine HARQ capabilities of the other UE, and
send HARQ capabilities of the UE to the other UE using a HARQ-less transmission mode, the HARQ capabilities of the UE and the HARQ capabilities of the other UE each including support of HARQ-based signaling for unicast sidelink communication, a time gap from a particular PSCCH or PSSCH transmission to an associated PSFCH transmission, a time gap from a particular PSFCH transmission to a next PSCCH or PSSCH transmission, an amount of feedback-based transmit and receive processes for unicast and groupcast operation, and a type of HARQ operation for groupcast.

* * * * *

UNITED STATES PATENT AND TRADEMARK OFFICE
CERTIFICATE OF CORRECTION

PATENT NO. : 11,695,531 B2
APPLICATION NO. : 16/825058
DATED : July 4, 2023
INVENTOR(S) : Khoryaev et al.

It is certified that error appears in the above-identified patent and that said Letters Patent is hereby corrected as shown below:

On the Title Page

In item (71), in "Applicants", in Column 1, Line 1, delete "Alexey Khoryaev, Nizhny Novgorod(RU); Sergey Panteleev, Maynooth (IE); Mikhail Shilov, Nizhny Novgorod (RU); Andrey Chervyakov, Nizhny Novgorod (RU)" and insert --Intel Corporation, Santa Clara, CA (US)-- therefor Signed and Sealed this
Twenty-ninth Day of October, 2024

Katherine Kelly Vidal
*Director of the United States Patent and Trademark Office*